United States Patent
Jonuska

(10) Patent No.: US 9,306,368 B2
(45) Date of Patent: Apr. 5, 2016

(54) LASER APPARATUS USING CAVITY DUMPING AND ACTIVE MODE LOCKING

(71) Applicant: Integrated Optics, UAB, Vilnius (LT)

(72) Inventor: Jonas Jonuska, Vilnius (LT)

(73) Assignee: Integrated Optics, UAB (LT)

( * ) Notice: Subject to any disclaimer, the term of this patent is extended or adjusted under 35 U.S.C. 154(b) by 0 days.

(21) Appl. No.: 14/416,982

(22) PCT Filed: Oct. 23, 2012

(86) PCT No.: PCT/IB2012/055816
§ 371 (c)(1),
(2) Date: Jan. 23, 2015

(87) PCT Pub. No.: WO2014/027227
PCT Pub. Date: Feb. 20, 2014

(65) Prior Publication Data
US 2015/0207292 A1   Jul. 23, 2015

(30) Foreign Application Priority Data

Aug. 16, 2012   (LT) .................................... 2012 074

(51) Int. Cl.
*H01S 3/115* (2006.01)
*H01S 3/11* (2006.01)
*H01S 3/107* (2006.01)
*G02F 1/03* (2006.01)
*H01S 3/091* (2006.01)
*H01S 3/10* (2006.01)

(52) U.S. Cl.
CPC ............ *H01S 3/1103* (2013.01); *G02F 1/0327* (2013.01); *H01S 3/091* (2013.01); *H01S 3/107* (2013.01); *H01S 3/10038* (2013.01); *H01S 3/10061* (2013.01); *H01S 3/11* (2013.01); *H01S 3/115* (2013.01); *H01S 3/1106* (2013.01); *H01S 3/1109* (2013.01); *H01S 3/1121* (2013.01); *H01S 3/1075* (2013.01); *H01S 3/1112* (2013.01)

(58) Field of Classification Search
CPC ..... H01S 3/115; H01S 3/1109; H01S 3/0013; H01S 3/11; H01S 3/107
USPC .................................................. 372/12, 10, 18
See application file for complete search history.

(56) References Cited

U.S. PATENT DOCUMENTS

| | | | |
|---|---|---|---|
| 3,550,031 A | | 12/1970 | Buchsbaum |
| 3,830,557 A | * | 8/1974 | Hook et al. .................... 359/255 |
| 4,375,684 A | | 3/1983 | Everett |
| 4,485,473 A | | 11/1984 | Tang et al. |
| 4,669,085 A | * | 5/1987 | Plourde et al. .................. 372/12 |
| 5,394,415 A | * | 2/1995 | Zucker et al. ................... 372/26 |
| 7,929,579 B2 | | 4/2011 | Hohm et al. |
| 2010/0296531 A1 | * | 11/2010 | Hohm et al. .................... 372/12 |

FOREIGN PATENT DOCUMENTS

GB        1387341         3/1975

OTHER PUBLICATIONS

Curley P F et al: "Frequency-modulated operation of a Ti: sapphire laser", Optics Communications, North-Holland Publishing Co. Amsterdam, NL, vol. 83, No. 1-2, May 15, 1991, pp. 85-91, XP024456056, ISSN: 0030-4018, DOI: 10.1016/0030-4018(91)90527-K [retrieved on May 15, 1991].

* cited by examiner

*Primary Examiner* — Kinam Park
(74) *Attorney, Agent, or Firm* — Bryant J. Keller; Kirton McConkie, P.C.

(57) ABSTRACT

This invention provides a solution for operating a mode-locking and cavity dumping laser apparatus using a single electro-optical switch or modulator, such as a Pockels cell, without the need of multiplexing between two sources of voltage. The complex waveform of electrical signal, which controls the Pockels Cell is achieved by employing the phenomena, called LC circuit ringing, where the LC circuit is formed from an inductive element and a capacitor, where the Pockels Cell works as a capacitor itself. The ringing frequency should be calculated such that the period of oscillations is preferably two times longer than the round-trip time of a light pulse inside the optical cavity. As a result, optical losses are created inside the cavity with a period, which coincides with the travel of a light pulse, thus the pulse build-up is consistent and stable.

18 Claims, 4 Drawing Sheets

LASER APPARATUS USING CAVITY DUMPING AND ACTIVE MODE LOCKING

FIELD OF INVENTION

The invention relates to lasers and optical amplifiers having a resonator for amplifying light and a voltage-driven electro-optic element for controlling the operation of the optical amplifier. More specifically it relates to self seeded pulsed lasers featuring active mode-locking.

BACKGROUND OF INVENTION

Short pulse lasers are built based on various techniques. One of the most popular techniques for making lasers with picosecond and sub-picosecond pulse durations is the mode-locking, where a short pulse is formed in the laser resonator in case a fixed phase relationship is achieved between its longitudinal modes, or more precisely, between the lines in the spectrum of the laser output. Typically such laser apparatus comprises a cavity with gain medium placed therein and an active or passive element, which creates resonator losses with a period of time, which corresponds to a round-trip time of a pulse inside said cavity. Passive elements are usually saturable absorbers, which change their transparency to a light pulse with increasing (decreasing) optical intensity.

Active mode locking is carried out by using acousto-optic, electro-optic modulators, a Mach-Zehnder integrated-optic modulator, or a semiconductor electro-absorption modulator. The modulation is synchronized with the resonator round trips and it usually results in generation of picosecond pulses.

Since saturable absorbers have fairly short recovery time, as compared to modulation frequency of active modulators, in general the achieved pulse durations are typically shorter for passively mode locked lasers.

Mode locked lasers usually feature high pulse repetition rates but low pulse energy. However if a higher pulse energy is desired, amplification techniques, such as cavity dumping or regenerative amplification are used.

Regenerative amplification (RA) is a powerful means for amplifying low energy pulses in a separate cavity. A pulse from mode locked laser is injected in a RA cavity by means of optical switch, comprised of an electro-optical modulator and a polarizer. Within several round-trips inside the RA cavity, the pulse is strongly amplified and out-coupled using the same or a different optical switch. This technique provides high amplification, however the optical design requires pricey components and is quite complex to build.

Cavity dumping is another amplification technique, where an optical switch extracts an amplified pulse from an optical cavity. The cavity can be operated both by mode locking or Q-switching principles and the optical switch is usually an acousto-optic modulator or an electro-optic modulator, such as Pockels Cell.

Cavity dumping is rarely used with actively mode locked lasers. Such technique is complicated as it involves using several optical modulators—one for active mode locking, the other for cavity dumping. For example, a Pockels Cell can be used for cavity dumping and an acousto-optic modulator could be arranged to create periodic losses inside the optical cavity or vice versa.

A U.S. Pat. No. 4,375,684 describes a technique where a single element interposed in a laser resonator cavity provides for AM mode-locking, Q-switching and dumping in a sequential operation. A Pockels cell or like polarization rotation device is first energized to prevent build-up of radiation in a laser cavity, is then switched to provide for mode-locking by energization with a periodically varying signal, and is finally energized to dump a single mode-locked pulse. The sequential operation permits the use of a single electro-optic element and a single pair of electrodes. Q-switching, mode-locking and dumping are accomplished utilizing the same physical effect in the crystal, e.g., polarization rotation.

The technique described above provides a solution, where a single electro-optic modulator can fully control the complete laser system. However the description and claims of the said patent provide an embodiment, where the Pockels Cell is energized from several different electrical sources and switching, i.e. multiplexing, is performed to transfer from one source (oscillating voltage) to another source (BIAS power supply). Such switching is complicated as very fast and expensive electrical switches should be used to control switching between the two sources. In addition, perfect phase matching should be kept between the two electrical regimes, which is also complicated.

U.S. Pat. No. 7,929,579 describes another improvement to the technique. Apparatuses and methods are disclosed for applying laser energy having desired pulse characteristics, including a sufficiently short duration and/or a sufficiently high energy for the photomechanical treatment of skin pigmentations and pigmented lesions, both naturally-occurring (e.g., birthmarks), as well as artificial (e.g., tattoos). The laser energy may be generated with an apparatus having a resonator with the capability of switching between a mode-locked pulse operating mode and an amplification operating mode. The operating modes are carried out through the application of a time-dependent bias voltage, having waveforms as described herein, to an electro-optical device positioned along the optical axis of the resonator.

This patent describes a method of controlling a Pockels Cell by means of switching circuitry, which provides switching between several power sources by means of transistors. However such system is also very complex and expensive to make in terms of electronics.

SUMMARY

In order to eliminate the drawbacks indicated above, this invention provides a solution for operating a mode-locking laser apparatus using single electro-optical modulator (2), such as a Pockels cell, without the need of multiplexing between two sources of voltage.

Said electro-optic modulator (2) is powered from a single electrical circuit having both—essentially a state, corresponding to high bias voltage and a state of oscillating voltage, without the need of multiplexing. The complex waveform of electrical signal, which controls the Pockels Cell (2) is achieved by employing the phenomena, called LC circuit ringing, where LC circuit is formed from an inductive element and a capacitor, where the Pockels Cell works as a capacitor itself. Pockels cells feature capacitance, typically in the range of 1 to 20 pF. The ringing frequency is then calculated by using this formula $$f = \frac{1}{(2\pi\sqrt{LC_{PC}})}$$

where L is the nominal value of an inductor and $C_{PC}$ is the capacitance of a Pockels Cell. If needed, the capacitance value can be increased by connecting another capacitor in parallel to the Pockels Cell.

The ringing frequency should be calculated such that the period of oscillations is preferably two times longer than the round-trip time of a light pulse inside the optical cavity. As a result, optical losses are created inside the cavity with a period, which coincides with the travel of a light pulse, thus the pulse build-up is consistent and stable.

DESCRIPTION OF DRAWINGS

In order to better understand the invention, and appreciate its practical applications, the following pictures are provided and referenced hereafter. Figures are given as examples only and in no way shall limit the scope of the invention.

DETAILED DESCRIPTION OF PREFERRED EMBODIMENTS

Figure 1:
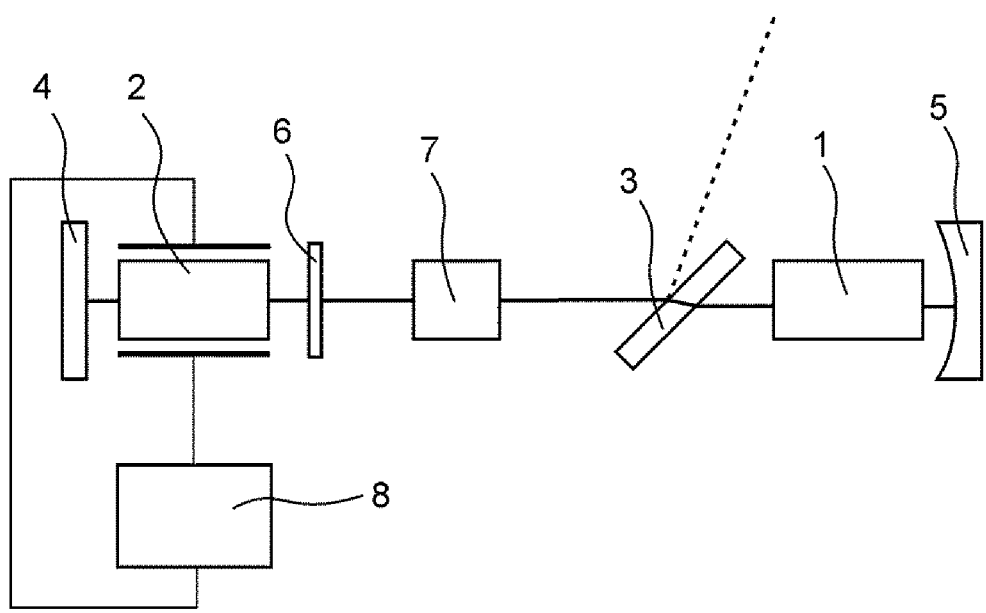
FIG. 1. illustrates simplified optical layout of a laser cavity.

The most preferred embodiment of the present invention is a laser apparatus comprising at least an optical cavity defined by a pair of end mirrors (4,5). Said cavity incorporates a gain medium (1) and an electro-optical switch/modulator. The electro-optical modulator is comprised of a device (2), capable rotating polarization of a beam inside the cavity, polarizer (3) and optionally a lambda plate (6). Said cavity can further include more optical components (7), such as Kerr-lens mode-locking unit, dispersion and diffraction compensating optics, etalons, etc. Said electro-optical device (2) is controlled by means of an electronics unit (8).

In this context an electro-optical device (2) is any optical unit, capable of changing the polarization state of an incident beam upon actuation by a control signal. Said optical unit can be controlled by application of electric and/or magnetic field, once an electric control signal is switched on. The type and configuration of the electro-optical element should not be considered as limiting, as far as the unit is capable of changing the polarization state of an incident laser beam or modulate the beam by means of periodic or non-periodic changes in polarization.

The polarizer (3) can be of any type, as long as beams of s and p polarizations are separated into two separate pathways, i.e. it can be a thin-film polarizer, polarizing cube, Nicol, Wollaston prisms or any other used by those skilled in the art.

Figure 2A:
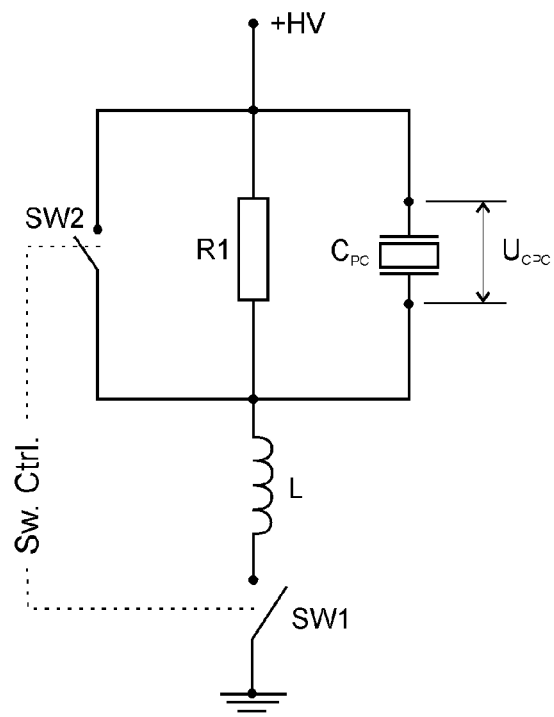
FIGS. 2A-2B. illustrate one embodiment of an electrical scheme (and a corresponding timing diagram) for controlling the electro-optical element, +HV indicates the high voltage power supply; SW1, SW2 are high voltage switches; $C_{pe}$—Pockels cell; L—inductor; R1—SW2 off state current leakage compensating resistor, not allowing to charge up $C_{pc}$ (Pockels cell)
Figure 2B:
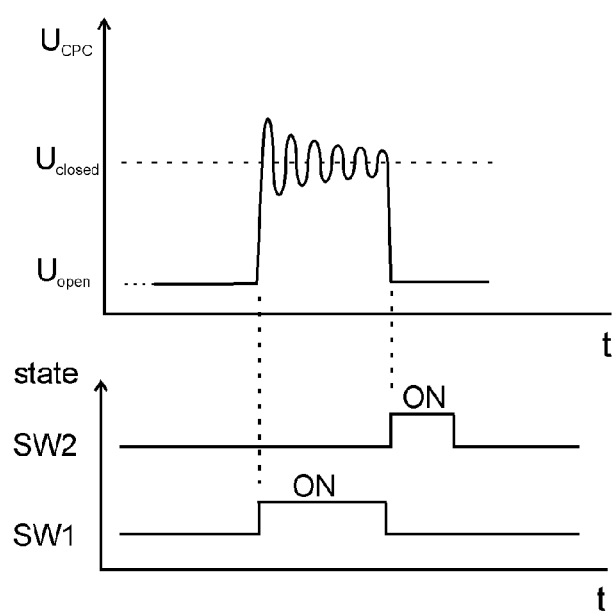

In the most preferred embodiment, the electro-optical unit is controlled by means of electrical signal, having a specific waveform, as shown in FIG. 1 and FIGS. 2A-2B. The waveform comprises essentially switching between the voltage $U_{open}$ and the bias voltage $U_{closed}$ with oscillations appearing at one of the states, at which conditions for amplification of a light pulse are ensured (in this example it is $U_{closed}$). There are several ways of arranging the Pockels Cell (2) inside the cavity. It can be orientated essentially in a way that it rotates the polarization of an incident beam without application of electric field, or vice versa—it can make no influence to the polarization state without application of the high voltage. With application of quarter wave or wave voltages, the electro-optical switch is switched from on state to another, thus rotating the polarization of an incident beam. Since there are number of variations, how Pockels Cell can be operated in a cavity, and how the Pockels Cell is built, it should be appreciated that a person skilled in the art can apply any of such knowledge creatively in order to realize this invention. Preferably, the amplification stage is entered with bias voltage $U_{closed}$ on as it is advisable to apply high voltage to the Pockels Cell for short time periods, i.e. for the duration of pulse amplification.

An exemplary sequence of operation can be described in following steps:

I the gain medium (1) is pumped with a light source;

II the electro-optical switch initially remains in a state where polarization of the beam is set to be reflected by the polarizer (3), thus forming huge optical losses in the cavity and suppressing laser generation;

III the electro-optical switch is switched to the state, which corresponds to lowest optical cavity losses and the cavity is filled with photons;

IV immediately after switching of the step III, oscillation of the voltage amplitude begins, which results in periodic losses created within the optical cavity, thus a light pulse is formed inside the cavity;

V the light pulse makes several round-trips in the cavity; every time it passes the gain medium (1) it depletes its excited state and is thus amplified;

VI after the pulse is amplified to desired level, the electro-optical switch is switched back to the state, which corresponds to a polarization, where most of the radiation is extracted from the cavity as it reflects from the polarizer (3), this step is called cavity dumping.

The sequence is repeated every time as it is desired that the laser outputs an amplified pulse. The state of the step IV can be referred to as the mode-locked state, where, which is achieved by means of periodically changing the quality (or losses) of the optical cavity. The half-period of modulation is preferably equal to a pulse round-trip time in the cavity. Any deviation in the period of oscillations is negatively influencing the mode-locking. With high mismatch of the pulse round-trip time with the period of oscillations the mode-locked state can not be achieved, thus the laser will not generate pulses in ps or sub-ps domain. In such case output pulse duration will be related to Pockels cell switching time.

For ensuring the best results, in the most preferred embodiment, the control electronics of the electro-optical device (2) comprises passive components, which form an LC circuit with the electro-optical device (2). In the most preferred case the electro-optical device (2) is a Pockels Cell, which essentially is a non-linear crystal placed between two electrodes. Such layout makes the Pockels Cell a capacitor. Typically, Pockels Cell units feature capacitances of few to tens of pico-Farads (pF). Combined with an inductive element, Pockels Cell forms a passive LC circuit, which has its resonance frequency. Such phenomena is often referred to as LC circuit 'ringing'. Herein and further we will call the resonance frequency of a LC circuit, wherein Pockels Cell acts a capacitor, a 'ringing frequency'. In the most preferred embodiment, the time period of this ringing frequency is 2 times longer than the round-trip time of a light pulse inside the optical cavity. It should be understood that one period of LC circuit oscillations performs a negative an a positive shift of the polarization rotation in the Pockels Cell (2), but in terms of cavity losses, both negative and positive shifts create losses, therefore it is to be calculated that a single period of voltage oscillations creates losses two times. However the losses creation shall not necessarily match with each round-trip of the pulse. These two events can match every n-th round-trip, thus the period of oscillations can be 2n times longer than the round-trip time. But in the most preferred embodiment, the oscillation period is two times longer than the round-trip time of a pulse.

The ringing frequency can be adjusted according to the length of the cavity (round-trip time) by changing nominal values of the inductor or by connecting additional capacitor in parallel to the Pockels Cell ($C_{pc}$). Other circuitry elements can be added as it seems required for a person skilled in the art in order to ensure desired characteristics of the ringing phenomena, such as damping, bandwidth, Q-factor and other parameters.

Pockels Cell is controlled by a high-voltage controller (8), which essentially is a fast switching circuit, capable of switching voltages in the order of hundreds of volts to 5 kV or similar. Such circuit is preferably made of fast transistors, of BJT, MOSFET, IGBT or similar type. The transistors can be connected in combinations—in series or in parallel. In context of this invention, high voltage Pockels Cell switches should not be confused with the switching element used in prior art, to switch between bias and oscillating voltage sources, i.e. the problem we are solving with this invention. High voltage switches are used in all Pockels Cell systems by default and it is not the object of this invention. However, current invention shall not be limited to a certain configuration of high voltage Pockels Cell switches.

Yet in another embodiment, the Pockels Cell (2) bias voltage $U_{open}$ is set to another value, which is typically lower than the quarter wave voltage. In such embodiment the Pockels Cell (2) together with the polarizer (3) work as a variable beam attenuator. Setting the Pockels Cell voltage lower than the quarter wave voltage, causes the pulse to be partially reflected from the polarizer (3) as the polarization is not completely switched to the state, where the reflection from the polarizer (3) is maximum. Such embodiment is useful when convenient change of pulse energy is desired without changing the pump power of the gain medium (1). Should it not be possible to adjust the amplitude of the Pockels Cell voltage, this embodiment can still be fulfilled by delaying the switching event so that the pulse would pass the Pockels Cell at the moment as it is not fully switched to the open state, i.e. the switching always features some ramp-up time, where the voltage is rapidly growing. If the pulse passes the Pockels cell during said ramp-up, the polarization state is changed less than in the regular operation, thus the pulse is only partially reflected from the polarizer (3).

In the preferred embodiment, the end mirrors (4,5) of the cavity are made substantially totally reflective. This term, and equivalent terms such as "substantially totally reflective" are used to indicate that the mirrors 4 and 5 completely reflect incident laser radiation of the type normally present during operation of the resonator, or reflect at least 90%, preferably at least 95%, and more preferably at least 99% of incident radiation. The mirror reflectivity is to be distinguished from the term "effective reflectivity," which is not a property of the mirror itself but instead refers to the effective behavior of the combination of second mirror, Pockels cell, and polarizer that is induced by the particular operation of the Pockels cell, as discussed in detail herein.

Yet in another embodiment, a non-linear optical element is inserted in the optical cavity to act as a Kerr-lens mode-locking unit (7). In such embodiment, even shorter pulse durations can be achieved. Such arrangement can potentially lead to pulse durations of femtosecond to picosecond range.

In the most preferred embodiment, pumping of the gain medium is performed by means of laser diodes, which are chosen to radiate suitable wavelength radiation and provide enough optical power, depending on the gain medium and cavity design used. Laser diode pumping can be both continuos or pulsed.

Yet in another embodiment, the pump source is another laser source. Such laser source can be either pulsed or continuos wave.

Yet in another embodiment the gain medium is pumped by a flash light source.

Types and regimes of pumping and materials of the gain medium influence operation of the complete cavity and a person skilled in the art can creatively use various pumping techniques and various gain materials in order to achieve desired stability, pulse energy or other parameters. For example, the gain medium materials can be solid state crystals, fibers, vapor, gas, dye or other conventional.

Electrical circuits and timing diagrams provided in FIGS. 2A-2B and FIGS. 3A-3B explain exemplary embodiments of the invention. Each of the circuit examples provided, comprise two high voltage switches (SW1, SW2). High voltage switches are usually distinguished by fast voltage ramp-up time but slow ramp-down time, therefore in arrangements, where both the ramp-up and ramp-down times are desired to be short, two switches are preferably used. In provided examples, one high voltage switch (SW1) is used to switch on the high voltage so that it fails onto the Pockels Cell circuit, and the second high voltage switch is used to connect the high-voltage power source to the ground. This ensures fast switching-off of the high voltages from the Pockels cell circuit.

In the example, illustrated in FIG. 2B, it is important that ramp-up time of SW1 is short. Ramp-down times of both switches (SW1, SW2) can be longer, however for SW2 it should not exceed the time of the dosed state, during which the pulse is amplified.

Figure 3A:
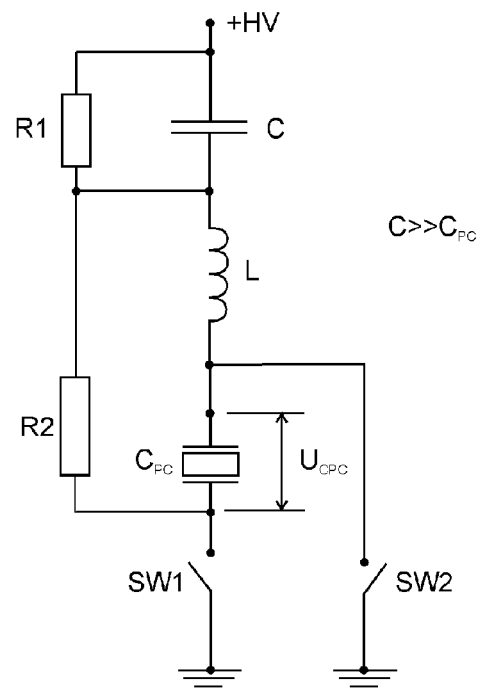
FIGS. 3A-3B. illustrate another representative embodiment of an electrical scheme (and corresponding timing diagram) for controlling the electro-optical elements meaning of symbols used is the same as in FIG. 2A. except R1—resistor used to discharge capacitor C, and R2—resistor used to discharge Pores ($C_{pc}$)
Figure 3B:
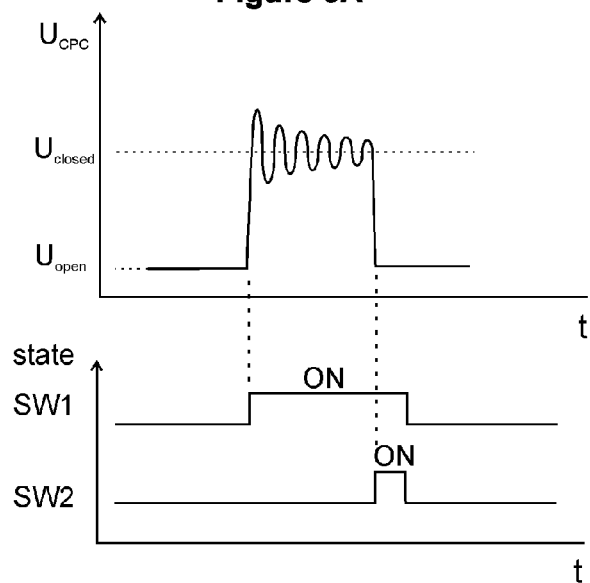

In case of the example illustrated in FIG. 3B, only ramp-up times of both switches (SW1, SW2) are important and should be low as possible. Ramp-down times are not essential.

Figure 4A:
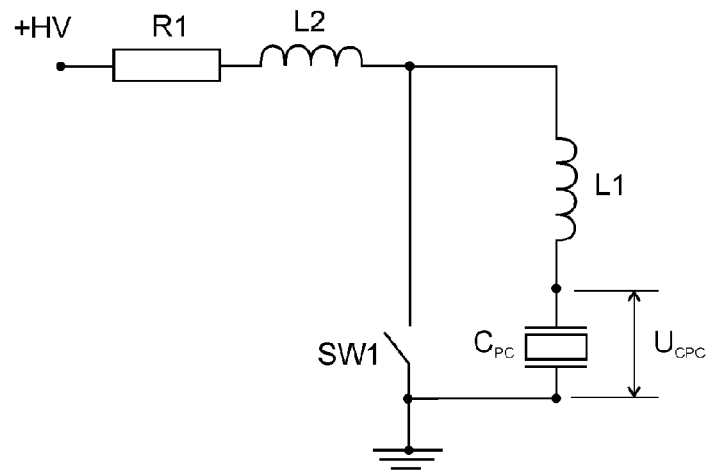
FIGS. 4A-4B. illustrate another representative embodiment of the electrical scheme (and corresponding timing diagram) for controlling the electro-optical element; this circuit comprises just a single high voltage switch.
Figure 4B:
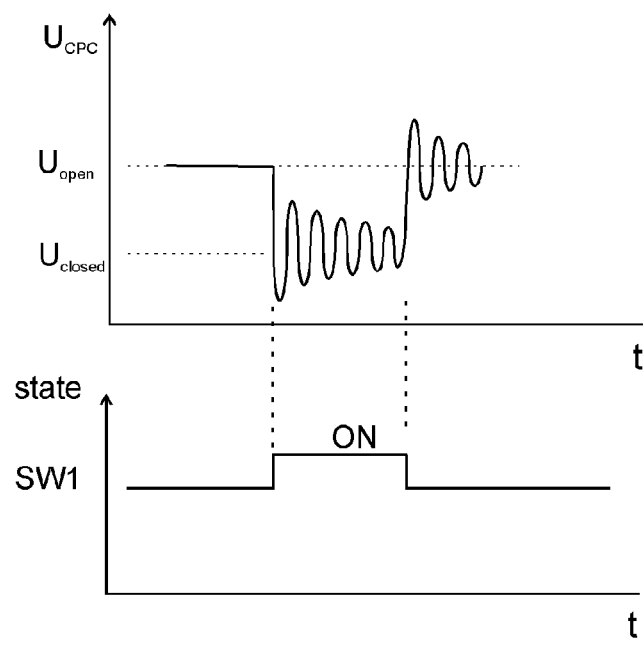

Yet in another embodiment, as illustrated in FIG. 4A, just a single high voltage switch is used, Such embodiment is possible only when both—ramp-up and ramp-down times are considerably short, i.e. the Pockels cell should fully transition into 'closed' and Open' states whenever a pulse passes through it.

Circuits provided in the figures are provided as an example of connecting the LC circuit with incorporated Pockels Cell to the high-voltage power source. However, such switching diagrams and circuitry examples should not limit the scope of this invention.

The invention claimed is:
1. A laser apparatus comprising:
an optical cavity defined by a pair of end mirrors, the end mirrors being substantially totally reflective;
a gain medium disposed within the optical cavity;
a Kerr-lens mode locking unit disposed within the optical cavity; and
an electro-optical modulator configured to change a polarization state of a beam inside the optical cavity,
wherein the electro-optical modulator is configured to be controlled by an electrical signal having at least two states of bias voltage, at least one of the states comprising voltage oscillations, wherein the voltage oscillations are configured to be initiated at a moment of switching between the at least two states and are determined and supported by means of a passive LC circuit configured to generate the voltage oscillations through a ringing phenomena at a frequency corresponding to a resonance frequency of the LC circuit, wherein L and C values are selected such that a period of the voltage oscillations of the LC circuit is about two times longer than a round-trip time of a light pulse inside the optical cavity, and wherein the optical cavity is configured such that radiation is extracted from the optical cavity as the radiation reflects from a polarizer.

2. The laser apparatus according to claim 1, wherein the electro-optical modulator comprises a Pockels Cell combined with a polarizer, and wherein the Pockels Cell is configured to act as a capacitor in the LC circuit, to create the voltage oscillations.

3. An electronics circuit configured to provide control signals to an electro-optical modulator, arranged inside an optical cavity of a laser apparatus, the laser apparatus comprising a Kerr-lens mode locking unit, the electro-optical modulator including a kilovolt-range voltage signal, wherein the electronics circuit comprises a passive LC circuit, which is configured to be activated when a high voltage value is changed in the electronics circuit by a solid-state switch, and wherein the LC circuit further features a ringing frequency.

4. The electronics circuit according to claim 3, wherein an electro-optical element is connected as a capacitor in the LC circuit.

5. The electronics circuit according to claim 3, wherein the LC circuit comprises an inductor component and a capacitor component, and wherein the inductor and capacitor components of the LC circuit are selected such that a period of the ringing frequency is about two times longer than a round trip time of a light pulse inside the optical cavity.

6. A laser workstation, comprising:
a pulsed laser source comprising:
    an optical cavity defined by substantially totally reflective end mirrors;
    a gain medium disposed within the optical cavity;
    a Kerr-lens mode locking unit disposed within the optical cavity; and
    an electro-optical modulator configured to change a polarization state of a beam inside the optical cavity, wherein the electro-optical modulator is configured to be controlled by an electrical signal having at least two states of bias voltage, at least one of the states comprising voltage oscillations, and wherein the voltage oscillations are configured to be initiated at a moment of switching between the at least two states and are determined and supported by means of a passive LC circuit configured to generate the voltage oscillations through a ringing phenomena at a frequency corresponding to a resonance frequency of the LC circuit; and a laser control electronics unit configured to provide control signals to the electro-optical modulator, arranged inside the optical cavity, the electro-optical modulator including a kilovolt-range voltage signal, wherein the electronics circuit comprises a passive LC circuit, which is configured to be activated when a high voltage power source is connected to the LC circuit by a solid-state switch, and wherein the LC circuit further features a ringing frequency.

7. The laser workstation according to claim 6, wherein the workstation is configured to function as a medical laser.

8. The laser workstation according to claim 6, wherein the workstation is configured for material machining.

9. The laser workstation according to claim 6, wherein the workstation is configured for a material science application.

10. The electronics circuit according to one of the claim 4, wherein the LC circuit comprises an inductor component and a capacitor component, and wherein the inductor and capacitor components of the LC circuit are selected such that a period of the ringing frequency is about two times longer than a round trip time of a light pulse inside the optical cavity and the light pulse propagates through the electro-optical modulator at a moment when the optical cavity losses are lowest.

11. The electronics circuit according to claim 4, wherein the electro-optical element comprises a Pockels cell.

12. The laser workstation of claim 6, wherein the electro-optic modulator comprises a Pockels Cell combined with a polarizer, and wherein the Pockels Cell is configured to act as a capacitor in the LC circuit to create the voltage oscillations.

13. The laser workstation of claim 6, wherein a period of the voltage oscillations of the LC circuit ringing phenomena is about two times longer than a round-trip time of a light pulse inside the optical cavity.

14. The laser workstation of claim 6, wherein the electro-optical modulator is connected as a capacitor in the LC circuit.

15. The laser workstation of claim 6, wherein the LC circuit comprises an inductor component and a capacitor component, and wherein the inductor and capacitor components of the LC circuit are selected such that a period of the ringing frequency is two times longer than a round trip time of a light pulse inside the optical cavity and the light pulse propagates through the electro-optical modulator at a moment when the optical cavity losses are lowest.

16. The laser workstation of claim 12, wherein an electro-optical element is connected as a capacitor in the LC circuit.

17. The laser workstation of claim 12, wherein the LC circuit comprises an inductor component and a capacitor component, and wherein the inductor and capacitor components of the LC circuit are selected such that a period of the ringing frequency is about two times longer than a round trip time of a light pulse inside the optical cavity and the light pulse propagates through the electro-optical modulator at a moment when the optical cavity losses are lowest.

18. The laser workstation according to claim 9, wherein the workstation is configured for use in at least one of microscopy, spectroscopy, and light and matter interaction research.

* * * * *